United States Patent
Seiden et al.

(10) Patent No.: US 8,650,115 B1
(45) Date of Patent: Feb. 11, 2014

(54) COMPUTER BASED TRADING SYSTEM AND METHODOLOGY UTILIZING SUPPLY AND DEMAND ANALYSIS

(71) Applicant: Newport Exchange Holdings, Inc., Irvine, CA (US)

(72) Inventors: Samuel Seiden, Northbrook, IL (US); Steven Albin, Irvine, CA (US); Gaylene Galliford, Santa Ana, CA (US)

(73) Assignee: Newport Exchange Holdings, Inc., Irvine, CA (US)

( * ) Notice: Subject to any disclaimer, the term of this patent is extended or adjusted under 35 U.S.C. 154(b) by 0 days.

(21) Appl. No.: 13/722,238

(22) Filed: Dec. 20, 2012

(51) Int. Cl.
*G06Q 40/00* (2012.01)

(52) U.S. Cl.
USPC .............................................. 705/37; 705/35

(58) Field of Classification Search
USPC ....................................... 705/35–40
See application file for complete search history.

(56) References Cited

U.S. PATENT DOCUMENTS

| 2012/0041861 A1* | 2/2012 | Nafeh et al. | 705/37 |
| 2013/0124379 A1* | 5/2013 | Gilbert | 705/37 |
| 2013/0179320 A1* | 7/2013 | May | 705/37 |

* cited by examiner

*Primary Examiner* — Thu Thao Havan
(74) *Attorney, Agent, or Firm* — Charles B. Lobsenz; Clifford Hyra; Symbus Law Group, LLC

(57) ABSTRACT

The system and methodology of the present invention operate to generate trading signals based on identifying various trading patterns referred to as setups. When these setups are detected, and depending on the specific setup detected, a supply zone or demand zone is next generated which indicates the price range for the instrument in which a sell or buy trade signal should be issued. When the underlying instrument trades within this range, and under other appropriate conditions, a trading signal is issued which may be sent directly to the appropriate exchange for automatic execution and/or sent to a graphical user interface or other display which alerts a trader to the proposed trade.

23 Claims, 12 Drawing Sheets

COMPUTER BASED TRADING SYSTEM AND METHODOLOGY UTILIZING SUPPLY AND DEMAND ANALYSIS

FIELD OF THE INVENTION

The present invention is directed generally to systems and methodologies for effectively trading securities and other liquid instruments, and, more particularly to systems and methodologies which are designed to provide traders the ability to purchase and sell such securities and other instruments at profitable pricing levels.

BACKGROUND OF THE INVENTION

While there is some variance depending upon the state of the economy and market conditions in general, the volume of securities traded on various worldwide markets and exchanges is exceedingly large and getting larger. Securities in this context can be any of a number of financial instruments such as stocks, bonds, mortgage backed securities, options, or, alternatively, hard assets such as precious metals, commodities and the like. The common element among these widely traded vehicles (hereinafter collectively referred to as "securities" for ease of reference), however, is that they enjoy a great deal of liquidity and the markets in which they trade are well established with many different buyers and sellers who participate in buying and selling the applicable security.

When there are a large number of buyers and sellers, the market for that security tends to be more active and perhaps more importantly, the spread between the available purchase price (the "ask") and the available selling price (the "bid") tends to be narrower. This in turn encourages buyers and sellers to participate in the buying and selling of that security since they are less likely to overpay or sell for too low of a price solely because of the "transaction cost" associated with the buy/sell spread which is incurred in executing the buy or sell transaction. Additionally, markets for securities tend to be more active where commissions and/or other fees and charges associated with the purchase and sale transaction are lower since the collective costs incurred from such costs and the bid/ask spread directly impact the profitability of trading that security.

In addition to minimizing transaction costs, profitable trading necessarily involves the need to purchase securities at a lower cost than the price at which the security is ultimately sold. Or, in the case of short selling, it is necessary to first sell the security at a higher cost than the price at which the security is ultimately covered. There are various known techniques, systems and methodologies for attempting to do just this. For example, some traders (typically individuals or "retail" traders as opposed to professional or "institutional" traders) will trade manually, largely based on nothing more than a gut feel. Alternatively, various individuals and even sophisticated individuals and institutional traders will use manual "systems" under which they devise a plan to make specific trades under various circumstances and market conditions. For example, such a trading plan may be as simple as buying XYZ stock when it sells for a price of $40 or lower (ask at $40 or below) and selling that same stock which it sells for a price of $44 or above (bid at $44 or above).

The foregoing plan may be implemented as a simple trading policy that a trader manually follows by entering appropriate buy and sell orders at the appropriate times. Or, the trader may utilize an online broker that provides the functionality for the trader to enter standing orders to make these trades when the specified market conditions are met. As yet another example, the trader may employ a software based tool that interacts and communicates with his or her brokerage trading platform to execute trades consistent with trading system rules. Other applications and services are also available which offer traders the ability to implement their own trading plan and/or plans and strategies developed by third parties.

The trading plan described above is generally considered to fall within the class of trading methodologies referred to as "technical analysis". In this class of trading methodologies, specific decisions are made based solely on historic price movement for the underlying security as well as expected future price movement based on mathematical analysis tied to price/time chart movements. Technical analysis techniques for predicting and acting upon expected future price movement are in widespread use by retail and institutional traders.

This class of techniques and the systems that implement them, however, do suffer from a number of drawbacks. For example, in many cases, a great many competing traders are using the same systems with the same predictive algorithms and are acting upon these predictions generated by these systems at the same time. At a market based level, this produces undesirable outcomes for these traders since they are competing at the same time to buy a security with others using the same algorithms based on the same predictions at the same time. Further, they are also competing against each other when the system indicates that the trader should sell a security. In both of these cases, an artificial demand (buy signal) or supply (sell signal) is created which tends to move the price up or down, respectively beyond what it would otherwise be and thus resulting, in theory, in a less profitable trade for each of the traders using the same system.

Another disadvantage of technical analysis is that, by definition, it is based on price movement that has occurred in the past and this information is used to predict price movement for the future. Unfortunately, it is theorized that price movement is largely random and instead driven only by supply and demand which exists in real time as opposed to what has happened in the past. The net result of this is that technical analysis tools, while they can be useful, are often times not the ideal predictor of future price movement.

Another class of trading techniques which are in use are those known as "fundamental analysis". This class of techniques relies on examining the fundamental properties of the asset underlying the security. For example, for a common stock associated with a company, trading decisions may be based on earnings, revenue and/or newsworthy events about that company's positioning within its industry. A practically unlimited number of other metrics may be used as well. More common examples include price to earnings ratios, level of debt, earnings growth, deals expected to add to revenue in the future, etc. In the case of securities which represent ownership in hard assets such as gold, oil, etc., trading decisions using fundamental analysis might include such metrics as predicted demand for the underlying asset, predicted supply, newsworthy stories regarding the applicable asset such as new oil wells being drilled, disruptions in the supply chain for bringing the asset to the end user, etc.

While fundamental analysis based decisions and the systems that implement them also have their place in trading, they also suffer from drawbacks. For example, notwithstanding a very good understanding of a company and its financial picture, the market for stock representing ownership in that company may depart from the realities of the value of that company. This is evidenced by the fact that all stocks do not, for example, trade at the same multiple of earnings. There are other factors that go into the real time price for a stock that can not be addressed by fundamental analysis. Examples include "buzz" about certain companies and industries, rumors concerning that company, and other intangible aspects of the value of a particular stock that can not be measured or predicted using known fundamental analysis techniques.

SUMMARY OF THE INVENTION

It is thus a primary object of the invention to provide a system and methodology that addresses the shortcomings of the prior art as discussed above.

It is another object of the present invention to provide a system and methodology which provides traders with improved trading results when trading a wide variety of securities, commodities and any other instrument which provides at least a reasonable degree of liquidity.

It is a further object of the present invention to provide a system and methodology which employs the realities of supply and demand in markets to provide enhanced predictions on price movement which in turn generates more profitable trading results.

It is a still further object of the present invention to provide a computer based trading system which generates recommended trading actions based upon the real time status of supply and demand for one or more securities or other tradable instruments.

It is a yet further object of the present invention to provide a computer based trading system for trading stocks based upon the real time status of the supply and demand for a particular stock.

It is another object of the present invention to provide a computer based trading system for trading commodities based upon the real time status of the supply and demand for a particular commodity.

It is a further object of the present invention to provide a computer based trading system for trading currencies based upon the real time status of the supply and demand for a particular currency.

It is a yet further object of the present invention to provide a computer based trading system that identifies one or more price over time patterns and, using known characteristics associated with market supply and demand, generating trading signals based thereupon.

A primary objective the invention disclosed herein is a system and methodology which effectively applies an objective set of rules that are aligned with the governing dynamics of supply and demand that works in any asset class (e.g. stocks, futures, Forex, options), in any market and in any timeframe.

The system and methodology of the present invention operate to generate trading signals based on identifying various trading patterns referred to as setups. When these setups are detected, and depending on the specific setup detected, a supply zone or demand zone is next generated which indicates the price range for the instrument in which a sell or buy trade signal should be issued. When the underlying instrument trades within this range, and under other appropriate conditions, a trading signal is issued which may be sent directly to the appropriate exchange for automatic execution and/or sent to a graphical user interface or other display which alerts a trader to the proposed trade.

DETAILED DESCRIPTION OF THE INVENTION

Figure 1:
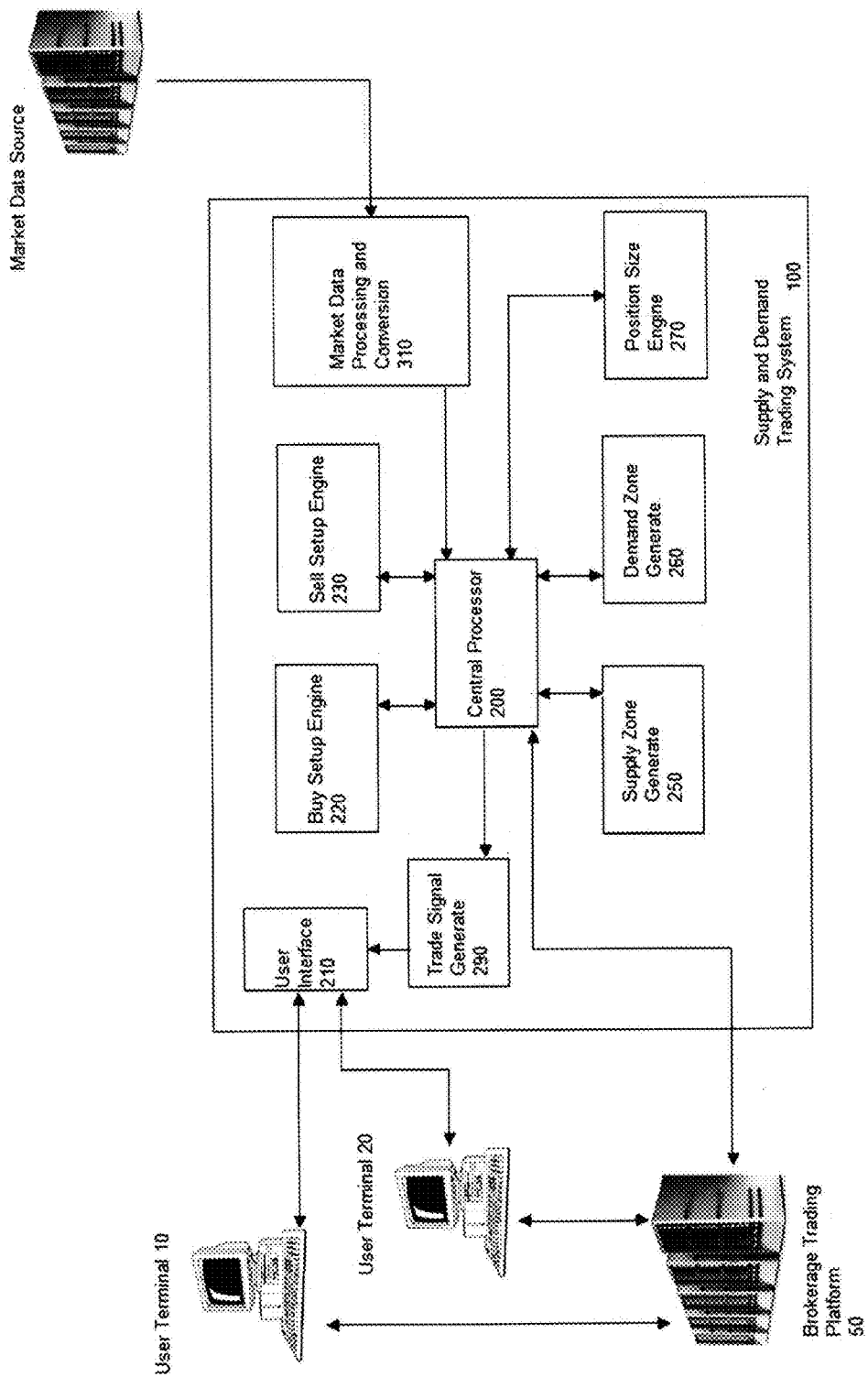
FIG. 1 is diagram depicting the major components of the system of the present invention in a preferred embodiment thereof.

With reference now to FIG. 1, the system of the present invention, in a preferred embodiment thereof, is now described. Trading System 100 is preferably a computer based system for implementing the functionality of the present invention as described in greater detail below. While an exemplary architecture is described, it will readily be understood by one of skill in the art, that an unlimited number of architectures and computing environments are possible while still remaining within the scope and spirit of the present invention.

Terminals 10 and 20 communicate with Trading System 100 via one of known methods. Examples include via an internet connection, hardwired, VPN, or on or more of various short range wireless technologies. Additional terminals beyond terminals 10 and 20 will typically also be in communication with Trading System 10 and 20 and the two terminals are shown merely as an example. Terminals 10 and 20 may comprise any of a variety of devices that allow a user to benefit from the trading methodologies and to access the system of the present invention. Terminals 10 and 20 will typically include an input means, a display and some level of internal processing capability. Examples of devices which might be employed as Terminals 10 and 20 include laptop computers, netbooks, smartphones, desktop computers and various other devices permitting user interaction with Trading System 100.

Terminals 10 and 20 as well as Trading System 100 preferably also communicate with brokerage trading platform 50 via one of the communication methods described above. Brokerage trading platform 50 comprises one or more of the trading platforms made available by one or more brokerage companies. Interaction between brokerage trading platform 50 and terminals 10 and 20 and Trading System 100 may be though one or more dedicated applications, APIs or other known methodologies that allow commands and data to be passed back and forth between and among brokerage trading platform 50, Trading System 100 and terminals 10 and 20. Brokerage trading platform 50 is typically a platform which allows users to place by and sell orders and other trading requests directly or indirectly with applicable exchanges and/or markets. For example, brokerage trading platform may be operated by an online stock broker or financial institution such as those operated by the likes of Scottrade, Charles Schwab, Fidelity, E*TRADE, etc. These brokers may also be those that participate in markets other than equities such as those that permit access to commodities, futures, and currencies markets as well as others.

In this way, trading commands generated from Trading System 100 can be communicated to the applicable broker for execution on the applicable market(s). Further, reports such as execution and current position reports can be communicated back from brokerage trading platform 50 to one, both or all of user terminals 10 and 20 and Trading System 100. Commands and requests for information to brokerage platform 50 may be issued by either or both of Trading System 100 and/or terminals 10 and 20.

Turning now to Supply and Demand Trading System 100 and its various components, such components will now be described at a high level and then the specific functionality and processes relating to each of these components will be explained in further detail below. Trading System 100 is preferably implemented on a general purpose computing platform such as a server computer which has sufficient processing power and input/output capabilities to support multiple sessions with multiple users accessing Trading System 100 simultaneously. At the heart of this computing platform is central processor 200 which manages and executes all processes hereinafter described. User interface 210 serves to provide the interface between Trading System 100 and terminals 10 and 20. This may include formatting data for transmission and display by user terminals 10 and 20 as well as receiving data from terminals 10 and 20 and formatting and/or converting such data in a manner such that it is usable by Trading System 100.

Trade signal generation functionality 290 represents a set of processes which collectively generate trading signals such as buy and sell signals which result from the execution of algorithms and processes which are resident within Trading System 100, such algorithms and processes being described in detail below. Trade signals are generated by trade signal generation functionality 290 as and when commanded by central processor 200 and such signals are communicated to user interface 210 for further communication to user terminals 10 and 20 and possibly to brokerage trading platform, as applicable. So, for example, if a signal to buy a specific stock results from one of the processes resident within Trading System 100, central processor 200 ensures that that signal is generated by trade signal generator 290 and communicated to one or more user terminals 10 and/or 20 (and/or others) for action. Thus, for example, a user may see that signal via a graphical user interface display on terminal 10 or 20 and then the user may manually act on that signal by buying the stock at the designated time and according to the designated conditions (explained below) via the user's broker whether online, via a call to the broker, via an email to the broker etc. Alternatively, the buy signal generated by trade signal generator 290 may be communicated directly by Trading System 100 (or indirectly via user terminal 10 or 20) to brokerage trading platform for automatic buy action without the need for user involvement or action.

Trading system 100 further preferably includes a number of functional components that execute the novel processes of the present invention which are designed to leverage information concerning supply and demand of various stocks, bonds and other vehicles which can be readily traded, to obtain profitable trading results. One of these components is buy setup engine 220 which employs the novel methodologies of the present invention to determine the price levels at which a security or other tradable instrument should be bought according to preferred embodiments of the present invention which are described in detail below. Similarly, sell setup engine 230 determines the price levels at which a security or other tradable instrument should be sold according to the teachings of the present invention in a preferred embodiment thereof. Supply zone generate functionality 250, which is under the control of central processor 200, generates a price level zone (range) in which supply and demand for a particular tradable instrument are out of balance in a way that the instrument should be sold since it is believed that an imminent price movement in the downward direction is expected. Further details about how this zone is determined, created and used according to the present invention, in a preferred embodiment, are provided below. Similarly, demand zone generate functionality 260 generates a price level zone (range) at which it is believed that supply and demand are out of balance in a way that a tradable instrument should be purchased since an imminent upwards price movement is expected.

Position size engine 270, under the control of central processor 200, may be optionally included within Trading System 100. Position size engine 270 serves to determine, based upon a specific trader's available capital and risk tolerance, the recommended position which should be purchased and/or sold in connection with the trading signals which are generated by Trading System 100.

Market data processing and conversion functionality 310 receives market data from one or more external sources and processes and formats this information so that it can be used by the other functional components of Trading System 100 such as buy setup engine 220 and sell setup engine 230. Examples of such data include real time market feeds associated with a great many tradable instruments of interest to and/or currently being traded by users of Trading System 100. For example this market data may comprise real time streaming data of price levels associated with various stocks, bonds, commodities, currencies, etc. as such data is made available by the relevant markets as well as third party data providers. In a preferred embodiment, this data represents the most accurate and current data available with respect to the tradable instruments so that signals generated by Trading System 100 are accurate, timely and actionable.

Figure 2:
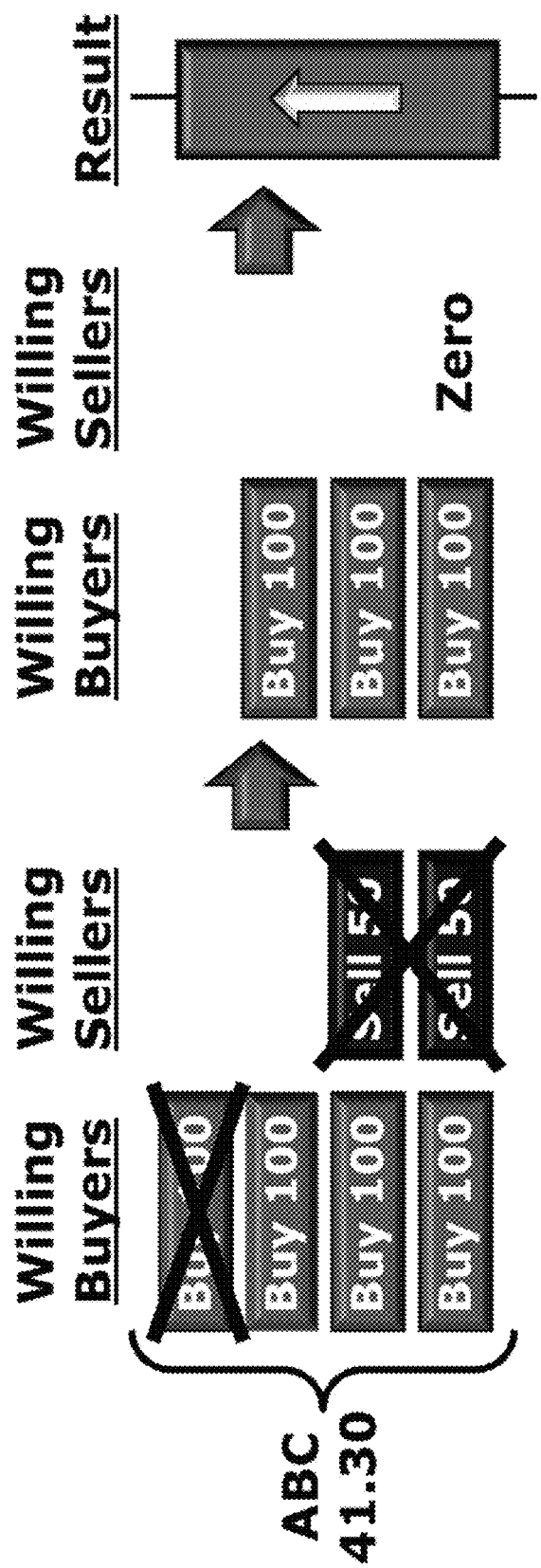
FIG. 2 is a diagram illustrating the supply and demand relationship for an exemplary stock in an exemplary market in which that stock is traded.

Now that the system of the present invention and its various components, in a preferred embodiment thereof, have been described, the novel teachings of the present invention with respect to the various methodologies employed to generate trading signals will now be discussed. With reference to FIG. 2, a discussion with respect to the dynamics of supply and demand is now provided as the backdrop for the many novel aspects of the present invention. In this example, the market for ABC which is currently trading at $41.30 per share is illustrated in its initial state to the left of the leftmost arrow. In this state, there are 4 different willing buyers that each seek to buy 100 shares of ABC at a price of $41.30. Further, there are 2 willing sellers that each seek to buy 50 shares of ABC at a price of $41.30. Due to this equilibrium, willing buyers and sellers that are willing to buy and sell at the same price are matched either randomly or according to one or more predetermined exchange rule(s). In this case, the buyer represented by the top rectangle purchases 100 shares which are obtained from the two willing sellers that are each willing to sell 50 shares at the agreed upon price.

Instantaneously upon completion of the above buy/sell transaction, the market for ABC at a price of $41.30 shifts to that represented to the right of the leftmost arrow. Now, there remain three buyers each willing to purchase at $41.30 but no willing sellers at this price. As a result of this instantaneous market condition, and based on supply and demand, the price at which ABC can be purchased (ask) will go up. In particular, the ask price will go up to the price at which the seller at the now lowest price is willing to sell shares of ABC. This also tends to have the effect of causing the bid price (the price at which buyers are willing to buy ABC) to go up, though this is not always the case. The increase in bid following an increase in ask due to exhaustion of available shares at a previous price may be largely due to human nature (greed) in terms of a desire to purchase the shares (demand) at a higher price notwithstanding that the price at which shares can be purchased has gone up.

In other words, each and every candle (a representation of stock price movement over time) is created as a direct result of an ongoing demand and supply relationship associated with the applicable trading instrument. Order flow with respect to that instrument is thus driven by the demand and supply for that instrument which is based on perceived value, fear and greed. Further, it is important to note that the origin of motion or change in price is an equation where one of two competing forces (buyers and sellers) becomes zero at a specific price.

In order to apply the novel teachings of the present invention to real time trading markets it is critical to determine where and when market prices for instruments turn. With respect to demand, price turns higher at a price level where willing demand exceeds willing supply. With respect to supply, price turns lower at a price level where willing supply exceeds willing demand. Since the markets for tradable instruments are almost always a zero sum game, the novel system and methodologies of the present invention operate to determine these pricing turning points and leverage the human emotions of fear and greed of other competing traders to provide optimum trading results.

The system and method of the present invention leverages knowledge of supply and demand characteristics and expected future price movements based on those characteristics to indicate the optimum times at which an instrument should be purchased or sold. These times coincide with price turning points which are identified by the system and methodologies of the present invention. And further, these turning points occur at times when supply and demand are out of balance for the particular instrument being traded. It is at this point that the system of the present invention identifies low risk, high reward, high probability entry and exit points in the markets via the generation of trading signals by trade signal generator 290 which can either be acted upon manually or which cause automatic trades to be made via brokerage trading platform 50.

Figure 3:
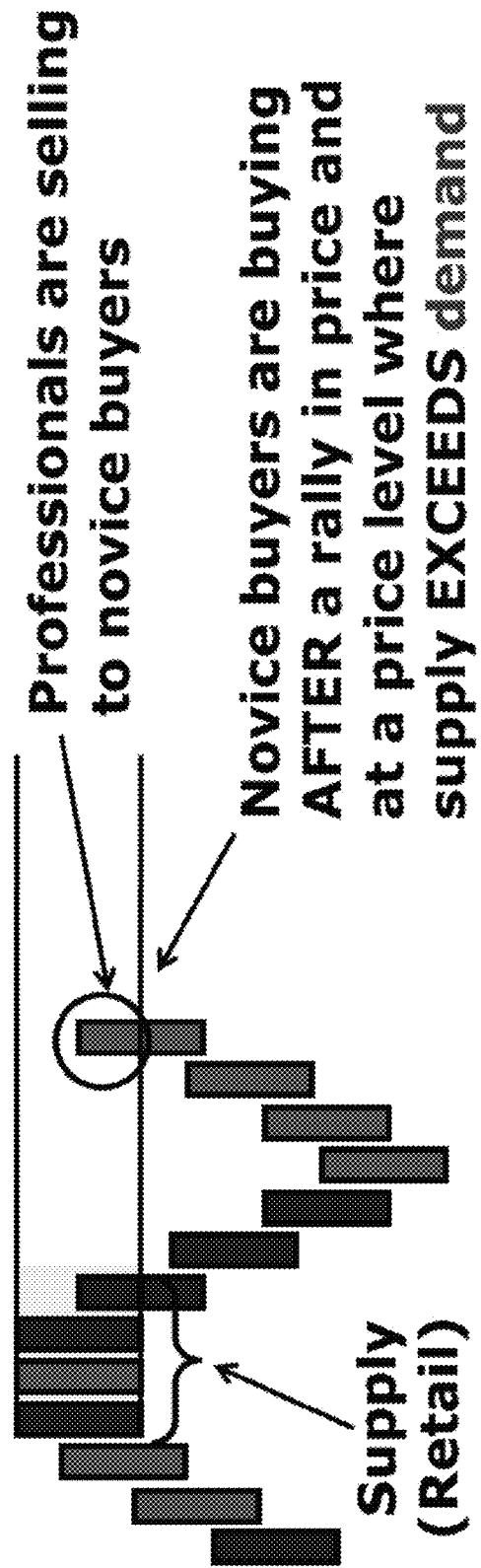
FIG. 3 is a diagram illustrating price movement for an underlying instrument in which market conditions reflect supply exceeding demand.

Again, operating under the assumption that trading in most markets is a zero sum game (winners win at the expense of losers losing), it is important to identify the mistakes that other traders typically make in markets so that these can be exploited by Trading System 100. The first mistake often made by novice traders is buying AFTER a rally in price and the second mistake also often made is buying at a price level where supply EXCEEDS demand. These concepts are illustrated in FIG. 3. In this figure, the price points between the two horizontal lines represent a market for the instrument in which supply exceeds demand. This is often the case after a rally in the instrument as shown by the rightmost four bars. In this case, there has been a rally in price to the point that there is more supply in the market than there is demand. This is often caused by large amounts of additional supply being added by professional traders at the higher price points. Notwithstanding that this is an inopportune time to buy, many novice traders do just that having seen the rally in the instrument recently occur. As will be discussed in greater detail below, Trading System 100, using market data available to it, determines where these turning points are and rather than buying in a case where supply exceeds demand, as determined by Trading System 100, a signal would instead be generated to sell the instrument.

Figure 4:
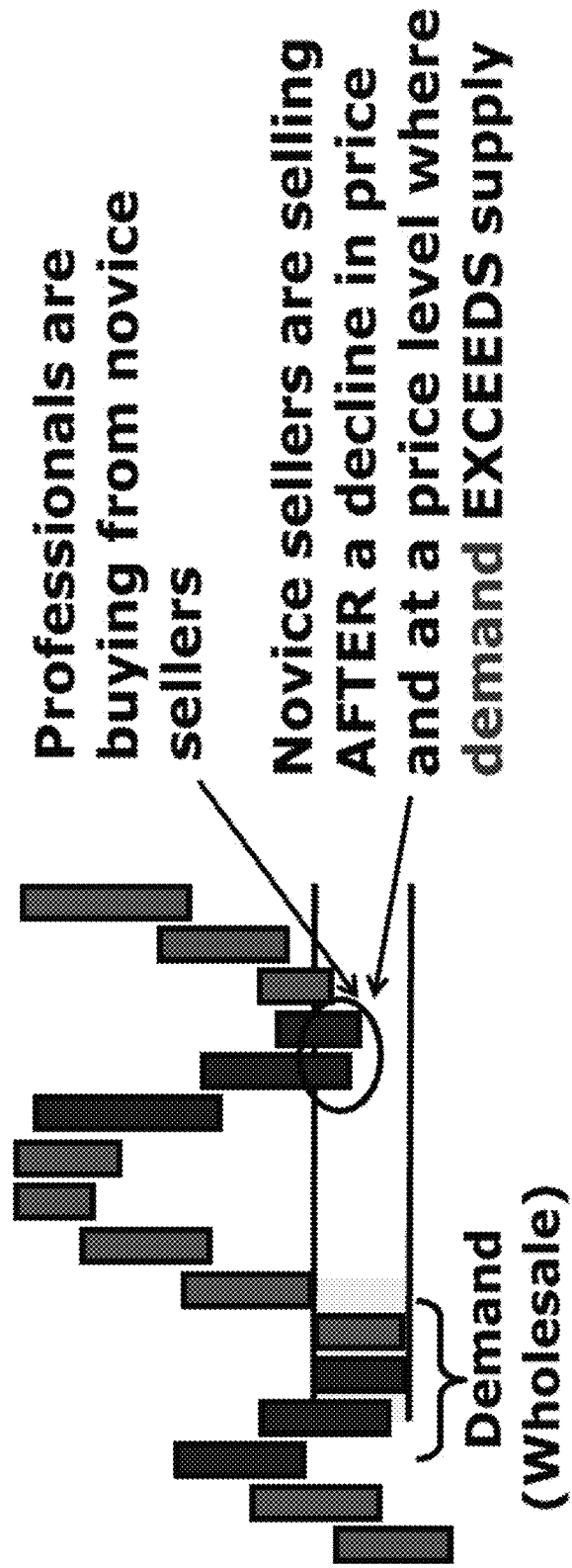
FIG. 4 is a diagram illustrating price movement for an underlying instrument in which market conditions reflect demand exceeding supply.

With respect to selling, there are similarly two common mistakes made by novice sellers. These are selling AFTER a decline in price and selling at a level where demand EXCEEDS supply. This is illustrated in FIG. 4. In this case, the price points between the two horizontal lines represent a market for the instrument in which demand exceeds supply. As can be seen in the figure, following three bars of steep downward price movement, the market gets to a point where demand exceeds supply. Often, novice traders will be selling at this point in time. Instead, Trading System 100 identifies market conditions such as they are and generates a buy signal rather than a sell signal.

Now that the underlying premises driving the strategies implemented by Trading System 100 have been described, the strategies, in a preferred embodiment thereof, will now be discussed. These strategies are largely defined by what are referred to herein as "set-ups" which are, in fact, the identification by Trading System 100 of market conditions which indicate that either a buy or sell transaction in a specific instrument should be made. The first set-up is referred to as a Demand Buy set-up. In this case, market data is received by market data processing and conversion component 310 under the control of central processor 200 and buy setup engine, which is constantly analyzing such market data, has detected one of these Demand Buy set-up conditions within the market for the instrument. This in turn causes a buy signal for the instrument to be generated by trade signal generator 290 and this signal is either communicated to one or more of user terminals 10 or 20 via user interface 210 or sent directly to brokerage trading platform 50 for execution.

Figure 5:
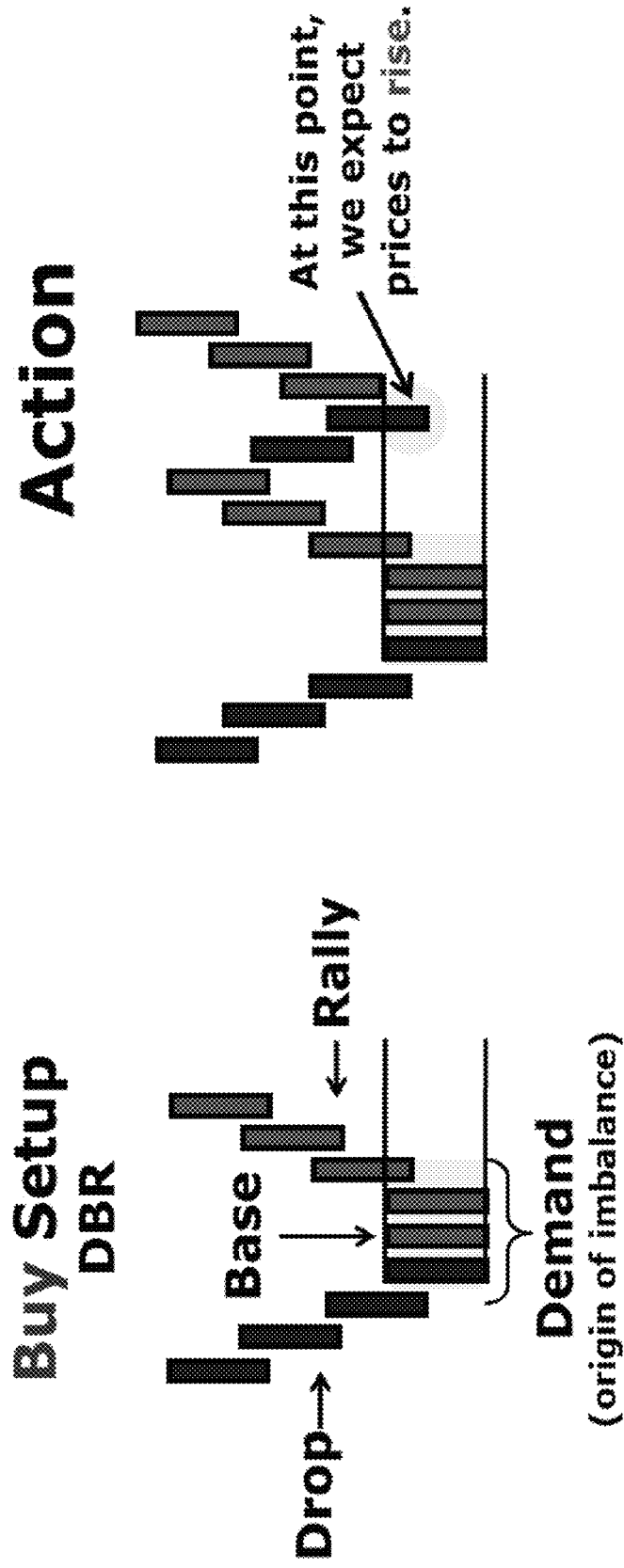
FIG. 5 is a diagram illustrating the drop-base-rally setup of the present invention in a preferred embodiment thereof as well as action to be taken when such a setup is identified.

FIG. 5 illustrates an example of a Demand Buy set-up as such might be detected by buy setup engine 220 according to a preferred embodiment. It will be understood and acknowledged by one of skill in the art that these specific market conditions are not exhaustive for when a buy set-up would occur. Further, the specific pattern detected is only one example of a setup which could be detected and exploited by the system of the present invention and the present invention is therefore not limited thereto. With reference to FIG. 5, an exemplary buy set-up which is referred to as a "drop-base-rally" set-up is illustrated. In this case, there are a series of candles in the downward direction (drop), followed next by a demand condition (base) which demonstrates that the instrument is in a market condition at which demand is equal to supply, followed by higher prices for the instrument (rally) identifying the origin of market imbalance where demand exceeds supply. These market conditions are detected by buy setup engine 220 during the start of the rally phase of the setup and as such, trade signal generator 290 generates a buy signal which can be acted upon when price returns back to the demand zone where the system determines that demand exceeds supply.

The action which should be taken in the case where a drop-base-rally is identified by buy setup engine 220 is illustrated in the right chart in FIG. 5. The drop-base-rally setup identifies the demand zone which serves as the entry zone for placing a buy order at the origin of the rally phase. The buy transaction (order) is executed when price revisits the identified demand zone. (a "buy retracement" as illustrated in the right chart). This market condition and its effects are explained in greater detail below. However, it is important to note, as is shown in FIG. 5, that notwithstanding this retracement, it is expected that prices will continue to rise given the out of balance supply and demand relationship as had been previously identified.

Figure 6:
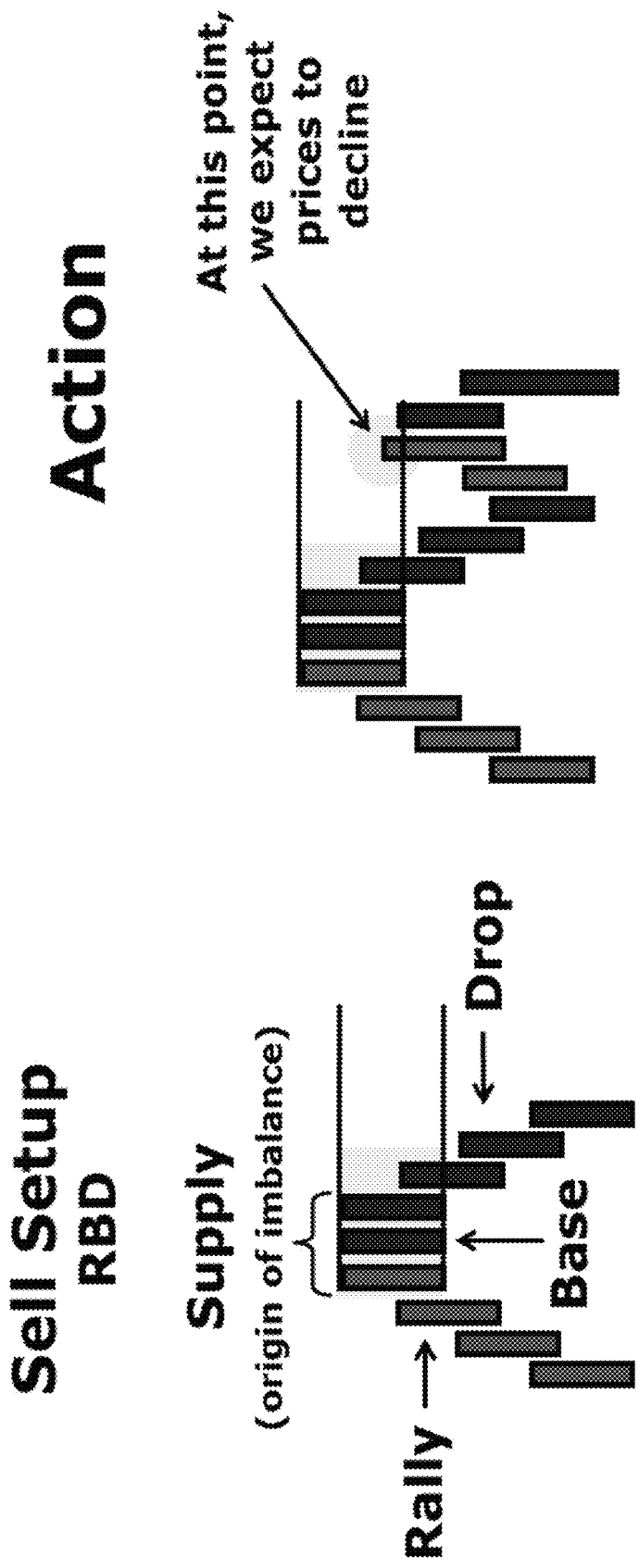
FIG. 6 is a diagram illustrating the rally-base-drop setup of the present invention in a preferred embodiment thereof as well as action to be taken when such a setup is identified.

Turning now to FIG. 6, a similar discussion is provided with respect to a Supply Sell set-up which may be detected by sell setup engine 230 and acted upon by Trading System 100. Once again, it will be understood and acknowledged by one of skill in the art that these specific market conditions are not exhaustive for when a sell set-up would occur. Further, the specific pattern detected is only one example of a setup which could be detected and exploited by the system of the present invention and the present invention is therefore not limited thereto. With reference to FIG. 6, an exemplary sell set-up which is referred to as a "rally-base-drop" set-up is illustrated. In this case, there are a series of candles in the upward direction (rally), followed next by a supply condition (base) which demonstrates that the instrument is in a market condition at which supply is equal to demand, followed by lower prices for the instrument (drop) identifying the origin of a market imbalance where supply exceeds demand. These market conditions are detected by sell setup engine 230 during the start of the drop phase of the setup and as such, trade signal generator 290 generates a sell signal which can be acted upon when price returns back to the supply zone where the system determines that supply exceeds demand.

The action which should be taken in the case where a rally-base-drop is identified by sell setup engine 230 is illustrated in the right chart in FIG. 6. The rally-base-drop setup identifies the supply zone which serves as the entry zone for placing a short sell order at the origin of the drop phase. The sell transaction (order) is executed when price revisits the identified supply zone (a "sell retracement" as illustrated in the right chart). This market condition and its effects are explained in greater detail below. However, it is important to note, as is shown in FIG. 6, that notwithstanding this retracement, it is expected that prices will continue to drop given the out of balance supply and demand relationship as had been previously identified.

Now that various examples of trading patterns for buy and sell setups have been described, the following discussion provides further details concerning how these set ups are employed by the system of the present invention to generate trading signals. In particular, signals are largely based, as described above, on detecting a series of price points for an underlying instrument in which the price level represents an out of balance supply and demand condition. These price points are identified as being in "supply zones" and "demand zones". A detailed description of how these supply and demand zones are determined by supply zone generator 250 and demand zone generator 260 of the present invention, in preferred embodiments thereof, now follows.

Figure 7:
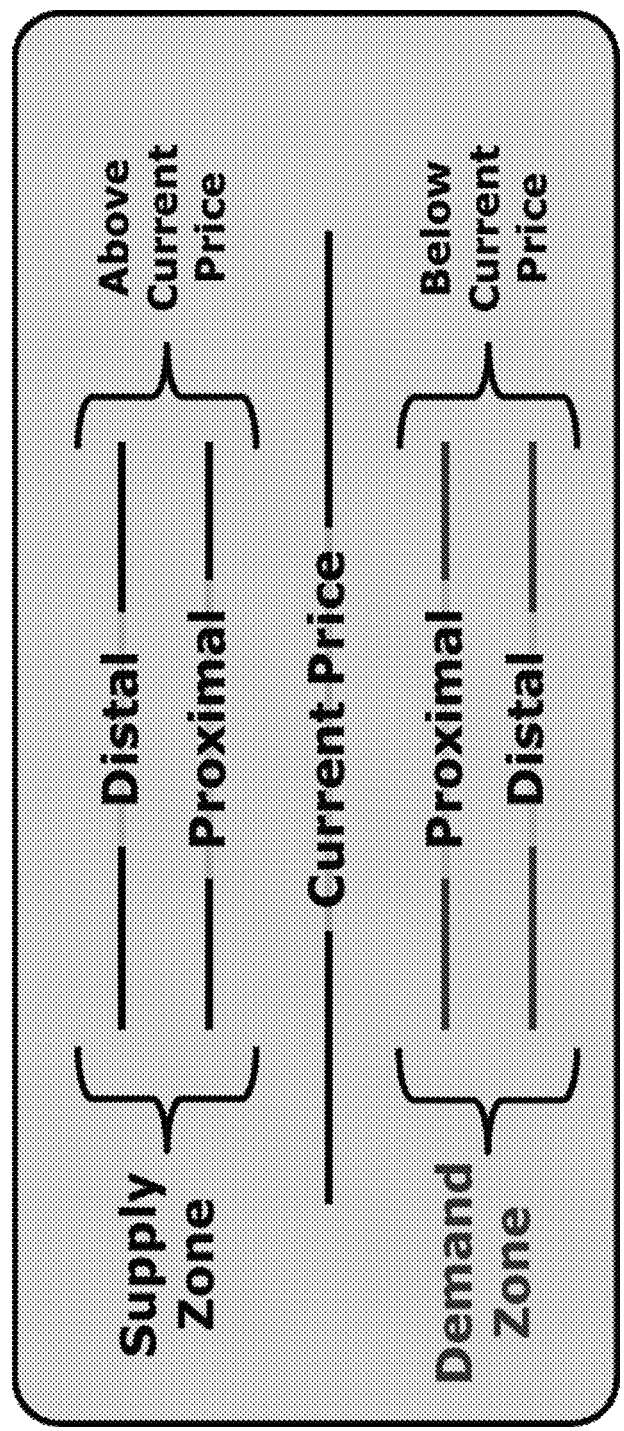
FIG. 7 is a diagram illustrating the supply and demand zones of the present invention in a preferred embodiment including the proximal and distal lines associated therewith.

Referring now to FIG. 7, each of the supply and demand zones are now discussed including where they fall on the price chart according to the teachings of the present invention. It its most basic sense, the supply and demand zones represent price ranges in which supply and demand for an underlying instrument is out of balance. In other words, it is believed that when an instrument's price falls within these zones that, in the case of a supply zone, supply exceeds demand and in the case of a demand zone, demand exceeds supply. According to the teachings of the present invention, when the price of an instrument trades within these zones, a sell or buy trade should be made given the expected future price movement.

While there is no guarantee that the price movement will actually occur in the future as expected, due to various other market forces and conditions including relatively infrequent market inefficiencies, it is believed that the trading signals generated by the present invention, based upon the use of the very powerful supply and demand relationships, represent low risk and high probability trades.

The supply zone is located above the current price of the underlying instrument and is comprised of two horizontal lines as they would appear on a price chart. The horizontal line which is at the lower price point and is closest to the current price is referred to as the proximal line and the higher price point line which is furthest away from the current price is referred to as the distal line. The price points within the range created by proximal and distal lines represent price points within the supply zone. With respect to the demand zone, the two lines are the proximal line which is closest to the current price (but below it) and at the higher price point and the distal line which is furthest from the current price and at the lower price point. The price points within this range represent price points within the demand zone.

Figure 8:
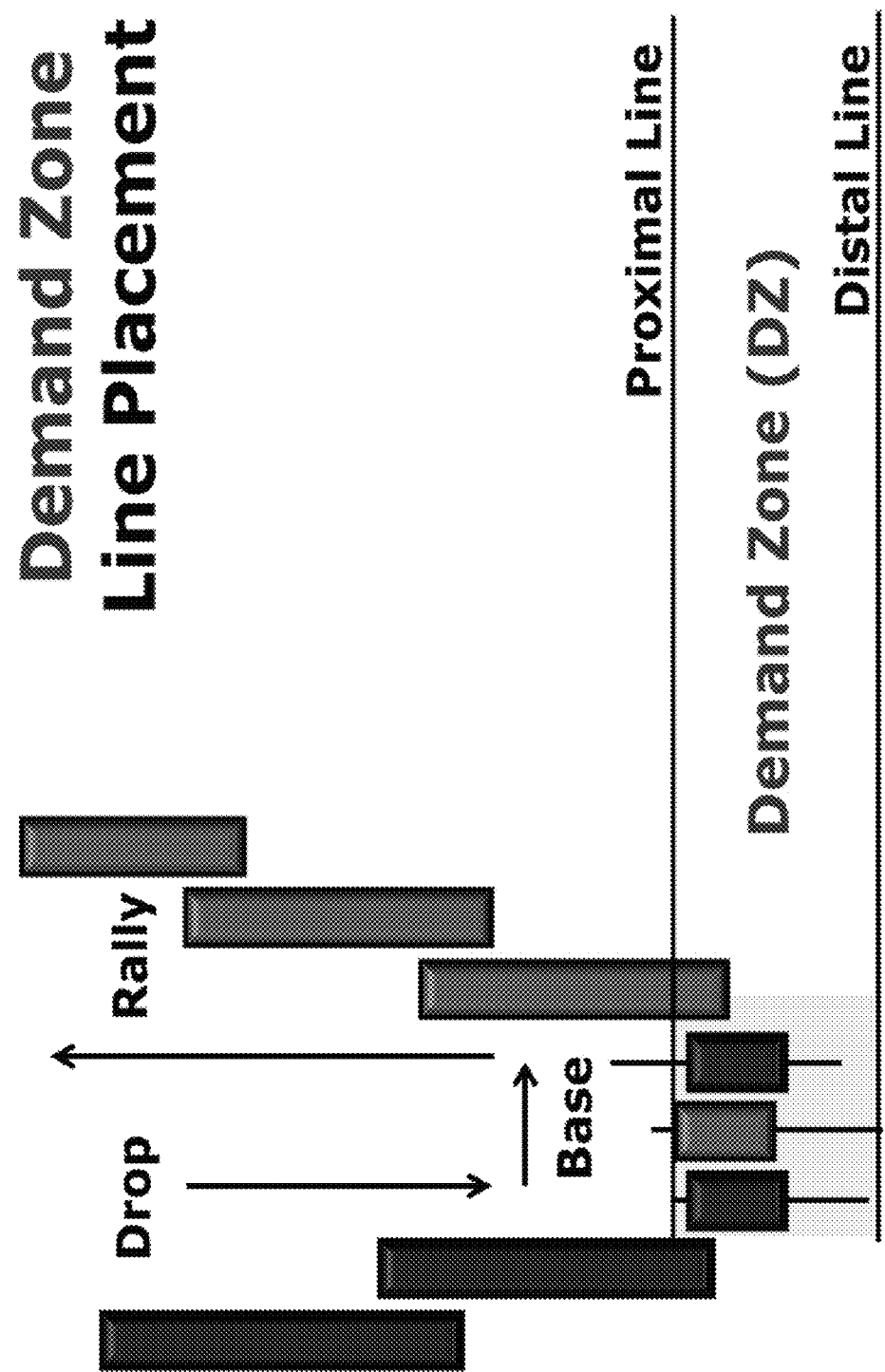
FIG. 8 is a diagram illustrating an exemplary drop-base-rally setup and an exemplary resulting demand zone which is created as a result thereof.
Figure 9:
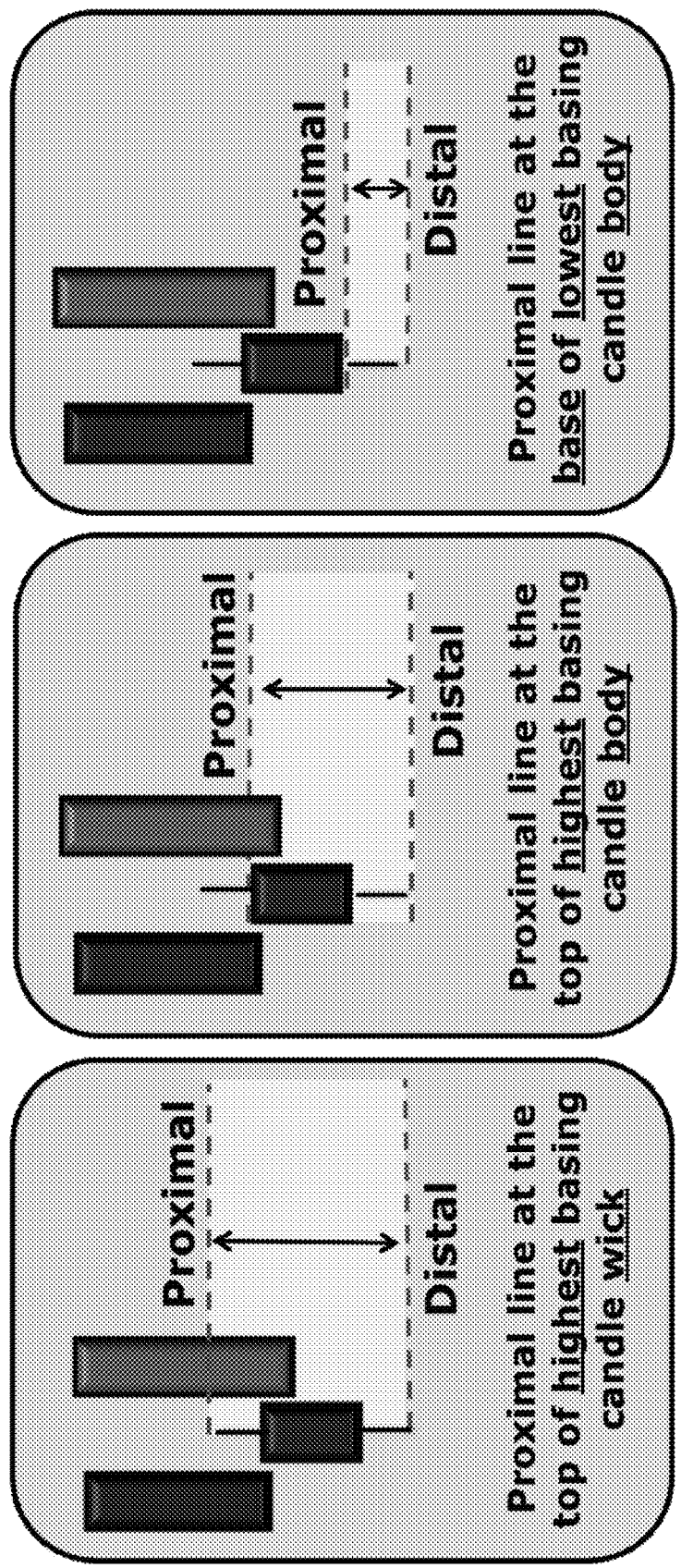
FIG. 9 is a diagram illustrating various options in constructing demand zones according to the present invention in a preferred embodiment thereof.

Turning now to FIGS. 8 and 9, the process for determining the demand zone according to the various preferred embodiments of the present invention is now described. In particular, demand zone generator 260 processes market data to determine the demand zone for a particular tradable instrument. In a preferred embodiment of the present invention, this processing as well as the reporting via generation of trade signals by trade signal generator 290 happens in real time or as close to real time as possible so that the trading signals can be most effectively executed in a way that enhances the chances for profitable trading.

The description of the determination of the demand zone including the placement of both the proximal and distal lines setting the boundaries thereof, is best understood through a discussion of an example of price movement in an instrument which is illustrated via a series of candles. It is presumed that one of skill in the art is well versed in the construction and use of Japanese candlestick charts, however a basic overview of the key aspects is now provided for convenience. With reference to FIG. 8, a series of candles are presented which reflect the instrument's pricing over a particular set of time periods. For example, each candle may represent a time period of one minute, with the chart showing a price movement over a series of one minute periods (each represented by a single candle) for a total of eight minutes given the example of eight successive candles in FIG. 8. Typically candles are made up of the body and the wicks. In this case, wicks are only shown for the third, fourth and fifth candles in time sequence.

The bodies (rectangular portion) represent the range of the opening and closing price, with the top of the body showing the open (if the instrument's price went down over the course of the relevant time period) and the bottom of the body showing the close (again, assuming the instrument's price went down over the course of the relevant time period. Alternatively, if the instrument's price increased over the course of the relevant time period, the top of the body will be the closing price for the time period and the bottom of the body will be the opening price for the time period. The wicks, which extend out from the body, reflect the range over the whole trading period with the top of the top wick representing the high price achieved for the time period and the bottom of the bottom wick representing the low price achieved for the time period. In one preferred embodiment of the present invention, the relevant time periods are very short, usually a minute or less so that rapid trades based on fast moving markets can be effectively made. Notwithstanding the foregoing, one unique advantage of the present invention is that it works regardless of the time period. Time periods ranging from a very short time (usually a minute or less) for rapid trading to longer time periods (usually daily and weekly candles) for swing and position trading and investing may be used while remaining within the scope and spirit of the present invention.

With that understanding and again referring to FIG. 8, the drop-base-rally chart pattern is shown. Darker candles illustrate downward price movement during the relevant period (assume, for example, one minute intervals). Therefore the first two candles show two successive one minute periods where the price of the instrument was dropping (meaning that the opening price for each of these periods is at the top of the body and the closing price for that period is at the bottom of the body). Then, the third, fourth and fifth candles show a basing condition with the third and fifth candles showing smaller downward price movement during the period and the fourth candle showing a small upward price movement during the period. Next, the rally is illustrated by candles 6, 7 and 8 which each reflect a significantly higher price at the end of the period as compared to the beginning of the period based on the lighter grey shading of the candle body.

According to a preferred embodiment of the present invention, the proximal line of the demand zone is drawn at the top of the basing candle bodies and the distal line is drawn at the bottom of the basing candle wicks. This is shown in FIG. 8 such that the proximal line is drawn at the top of the body of the fourth candle body and the distal line is drawn at the bottom of the bottom wick of the fourth candle body. This is the preferred methodology for generating the demand zone. However, FIG. 9 shows both this preferred methodology as well as alternate methodologies which may alternatively be used. In FIG. 9, the middle chart shows the preferred methodology while the left chart shows the placement of the proximal line at the top of the highest basing candle wick and the right chart shows placement of the proximal line at the base of the lowest basing candle body. In all cases, it is preferred that the distal line is located at the bottom of the bottom wick of the lowest basing candle. Of course, as will be readily apparent to one of skill in the art, these and other rules for placement of the proximal and distal lines, which in turn define the demand zone, may also be used without departing from the scope and spirit of the present invention.

Figure 10:
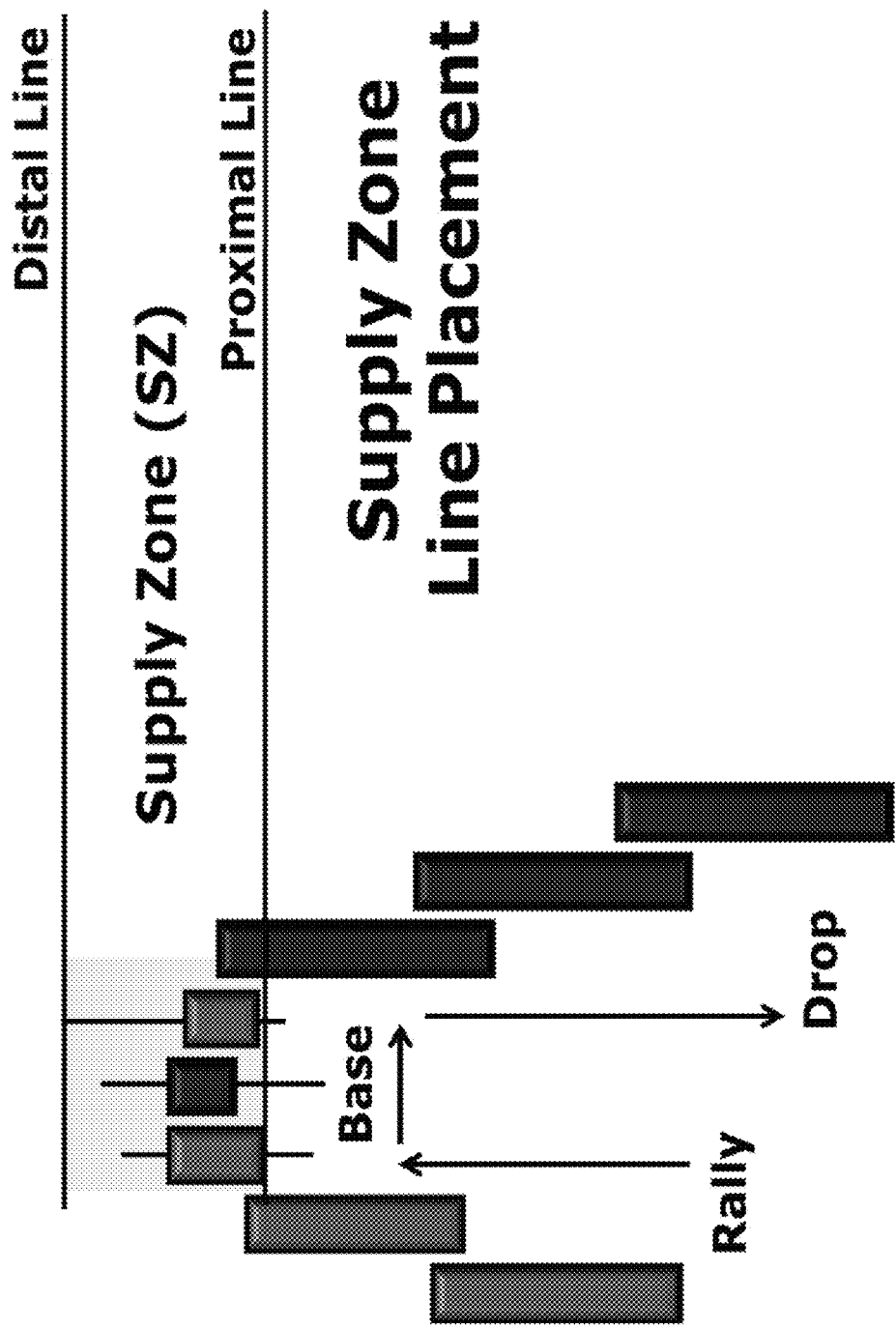
FIG. 10 is a diagram illustrating an exemplary rally-base-drop-setup and an exemplary resulting demand zone which is created as a result thereof.
Figure 11:
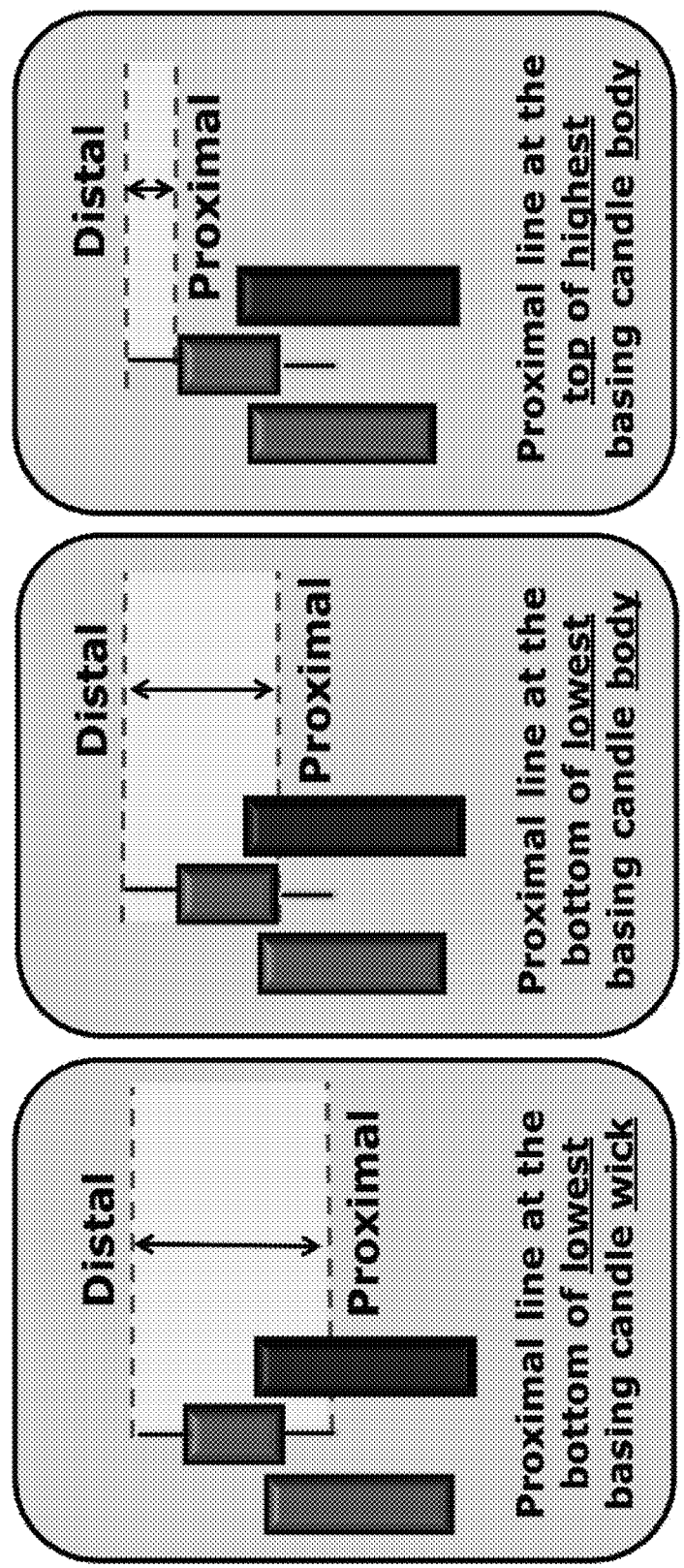
FIG. 11 is a diagram illustrating various options in constructing supply zones according to the present invention in a preferred embodiment thereof.

The determination of the supply zone according to a preferred embodiment of the present invention is similar to that which was just described for the determination of the demand zone. With reference to FIGS. 10 and 11, this process is now described. Supply zone generator 250 generates the supply zone including the proximal and distal lines in much the same way as described with respect to the demand zone. In this case, the rally-base-drop pattern is identified by sell setup engine 230 and using the exemplary price pattern of FIG. 10, the basing candles ($3^{rd}$, $4^{th}$ and $5^{th}$) are used to determine the distal and proximal lines for the supply zone, which as discussed above, determines where sell signals are generated by trade signal generator 290.

With reference to FIG. 11, in the supply zone case, the proximal line is located at the bottom of the lowest basing candle body in a preferred embodiment of the present invention. Alternately, the proximal line may be located at the bottom of the lowest basing candle wick (left diagram) or at the top of the highest basing candle body (right diagram). With proximal and distal line placement, there are two primary principals at work. The size of the zone and the placement of the proximal line in relationship to the base of the zone. With respect to zone size, the bigger the zone, the better chance the order will meet entry and the trade will be executed, but also the greater amount of risk taken on. The smaller the zone, the lower the chances of order execution but the risk is minimal as well. With respect to proximal line placement, the closer the proximal line is placed to the current price, the better chance the order will be filled, but the potential profit margin is diminished. In all cases, it is preferable that the distal line be located at the top of the top wick of the highest basing candle body.

According to a preferred embodiment of the present invention, trades are triggered with respect to supply and demand zones according to one of three models. Other models are also possible. In a first model, known as a "limit entry", a sell limit order for a sell entry is placed just above the proximal line of the supply zone with a buy stop order also being placed just above the distal line. Similarly, a buy limit order is placed at the point just below the proximal line with a stop loss sell order also being placed just below the distal line of the demand zone.

A second model is known as a "zone entry". In this case, as sell limit or market order is placed when the price occurs anywhere within the supply zone. Again, it is preferably to also place a buy stop order just above the distal line of the supply zone. A limit or market sell short order may also or alternatively be placed when the price occurs anywhere inside the supply zone. With respect to the demand zone, a limit or market buy order is placed when the price occurs anywhere within the demand zone.

A third model is known as a "confirmation entry". In this case, a sell short order is placed when the price rallies into the supply zone first and is shorted when the price crosses below the proximal line of the supply zone. Further, a buy order is placed when the price drops into the demand zone first and the instrument is purchased when the price crosses above the proximal line.

According to these models, the limit entry has the following advantages:
 1) Probability of meeting entry is the highest
 2) It is typically a set and forget strategy
and suffers from the following disadvantages:
 1) Higher risk than zone entry
 2) Lower reward than zone entry
 3) Greatest unknown, increasing chance of stopping out
The zone entry has the following advantages:
 1) Risk is the lowest of entry types
 2) Reward is greatest of entry types
 3) Probability of meeting entry is higher than confirmation entry
and suffers from the following disadvantages:
 1) Lower probability of meeting entry
 2) Typically requires manual entry
The confirmation entry has the following advantages:
 1) Risk is the same as limit entry
 2) Reward is the same as limit entry
 3) Less chance of stopping out
and suffers from the following disadvantages:
 1) Lowest probability of meeting entry
 2) Typically requires manual entry As will be apparent to one of ordinary skill in the art, the above three models are merely exemplary as possible models for trade entry and exits and other models are possible while remaining within the scope and spirit of the present invention.

Another aspect of the present invention involves selection of the position size to be traded for a specific instrument according to a preferred embodiment. This may be, for example, the proposed number of shares of a stock to buy, sell or sell short. The proposed position size may be based on, for example, trading capital, existing positions, risk tolerance as well as other factors. According to the present invention, first the maximum risk amount is specified based on a percentage of available trading capital. For example, if the available trading capital is $100,000 and the risk percentage is 1%, then the maximum risk amount would be $1000. Next, the stop size is calculated. This is calculated by system 100 as the difference between the buy entry price point and the protective stop point. So, for example, if the buy entry price point is located at the proximal line of the demand zone (assume a price of $22.30) and the protective stop is located just below the distal line of the demand zone (assume a price of $21.90), then the stop size equals $0.40. At the next step, the maximum position size is calculate as the maximum risk amount divided by the stop size—in this example, $1000/0.40, or 2500 shares.

Figure 12:
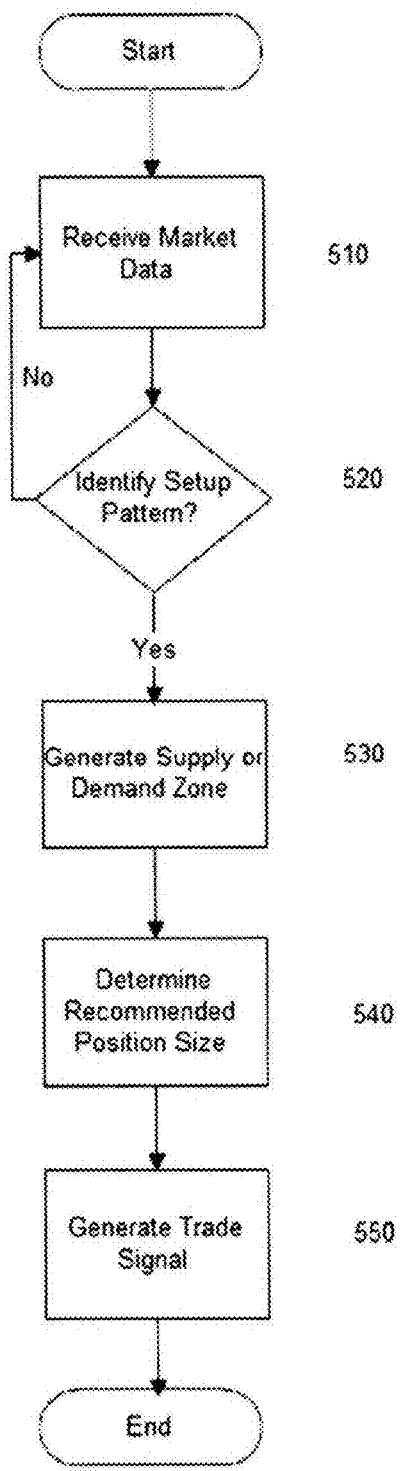
FIG. 12 is a flowchart illustrating the steps associated with the process of the present invention as may be executed by the system of the present invention in a preferred embodiment thereof.

With reference now to FIG. 12, a discussion of the high level steps undertaken by Trading System 100 in connection with monitoring markets and ultimately issuing trading signals, in a preferred embodiment thereof, is now provided. At step 510, system 100 receives market data which is processed and formatted for use by market data processing and conversion functionality 310. This market data may be data for any tradable instrument such as, and without limitation, a stock, bond, currency, commodity etc. Typically, the system of the present invention will be receiving and processing streams of market data for a number of instruments at any one time since multiple users may be accessing system 100 simultaneously and each of those users may themselves be interesting in trading multiple different instruments. It is important to note that system 100 may be implemented with respect to all trading instruments for any timeframe (high speed intraday to longer term investing) while still remaining within the spirit and scope of the present invention. At step 520, both buy setup engine 220 and sell setup engine 230 process the market data as described above to identify the setups which may represent a trading opportunity.

Once a setup pattern for a particular instrument is identified by either buy setup engine 220 or sell setup engine 230, either demand zone generator 260 or supply zone generator 250, respectively, will next generate a demand zone or supply zone, respectively, representing the price range at which the trading opportunity exists as described above. Optionally, at step 540, a position size associated with the proposed trade is determined as described above. Finally, at step 550, once the market data indicates that price level for the specific instrument is within the supply zone or demand zone as described above, a trading signal is issued by trade signal generator 290 for proposed action. The trading signal may be issued directly to a brokerage trading platform 50 or to an exchange or other market and/or this signal may be provided to a user at a user terminal (10 or 20) via a graphical user interface which may be associated with one or more trading applications resident on the user terminal (10 or 20).

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims.

The invention claimed is:

1. A computer based trading system comprising:
   a market data receiving and processing engine which receives pricing data associated with at least one tradable instrument;
   at least one trade setup engine which identifies at least one predefined pricing pattern based upon said pricing data associated with said at least one tradable instrument;
   at least one pricing zone generator which, upon indication from said at least one trade setup engine that a predefined pricing pattern has been identified, generates a pricing zone defined by proximal and distal price points; and
   a trade signal generator which signals a trade recommendation following said generation of said pricing zone.

2. The trading system of claim 1 wherein said at least one trade setup engine comprises a buy setup engine.

3. The trading system of claim 1 wherein said at least one trade setup engine comprises a sell setup engine.

4. The trading system of claim 2 wherein said pricing zone generator generates a demand zone.

5. The trading system of claim 3 wherein said pricing zone generator generates a supply zone.

6. The trading system of claim 1 wherein said predefined pricing pattern comprises a drop-base-rally setup.

7. The trading system of claim 1 wherein said predefined pricing pattern comprises a rally-base-drop setup.

8. The trading system of claim 4 wherein said distal price point comprises the price point represented by the bottom of a basing candle wick.

9. The trading system of claim 5 wherein said distal price point comprises the price point represented by the top of a basing candle wick.

10. The trading system of claim 4 wherein said proximal price point comprises the price point at the top of the highest basing candle body.

11. The trading system of claim 5 wherein said proximal price point comprises the price point at the bottom of the lowest basing candle body.

12. The trading system of claim 1 wherein said trade signal generator signals a trade execution rather than a trade recommendation.

13. A method for generating trading signals comprising the steps of:
   Receiving, via a trading system implemented on a computing platform, market data associated with at least one tradable instrument;
   identifying, via the trading system, at least one predefined pricing pattern associated with said market data;
   based upon the identification of said predefined pricing pattern, generating via the trading system a pricing zone defined by a proximal price point and a distal pricing point; and
   generating, via the trading system, a trading signal indicating a recommended trade.

14. The method of claim 13 further comprising the step of communicating a trade execution request to a brokerage platform.

15. The method of claim 13 further comprising the step of communicating a trade execution request to a market exchange.

16. The method of claim 13 wherein said pricing zone comprises a demand zone.

17. The method of claim 13 wherein said pricing zone comprises a supply zone.

18. The method of claim 13 wherein said predefined pricing pattern comprises a drop-base-rally setup.

19. The method of claim 13 wherein said predefined pricing pattern comprises a rally-base-drop setup.

20. The method of claim 16 wherein said distal price point comprises the price point represented by the bottom of a basing candle wick.

21. The method of claim 17 wherein said distal price point comprises the price point represented by the top of a basing candle wick.

22. The trading system of claim 16 wherein said proximal price point comprises the price point at the top of the highest basing candle body.

23. The trading system of claim 17 wherein said proximal price point comprises the price point at the bottom of the lowest basing candle body.

* * * * *